(No Model.) 3 Sheets—Sheet 1.
M. F. KOCH.
AUTOMATIC WEIGHING SCALE.
No. 346,852. Patented Aug. 3, 1886.
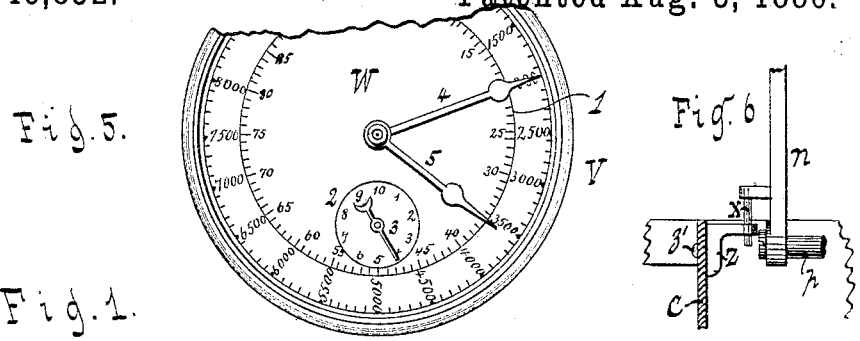
Fig. 5.  Fig. 6.
Fig. 1.
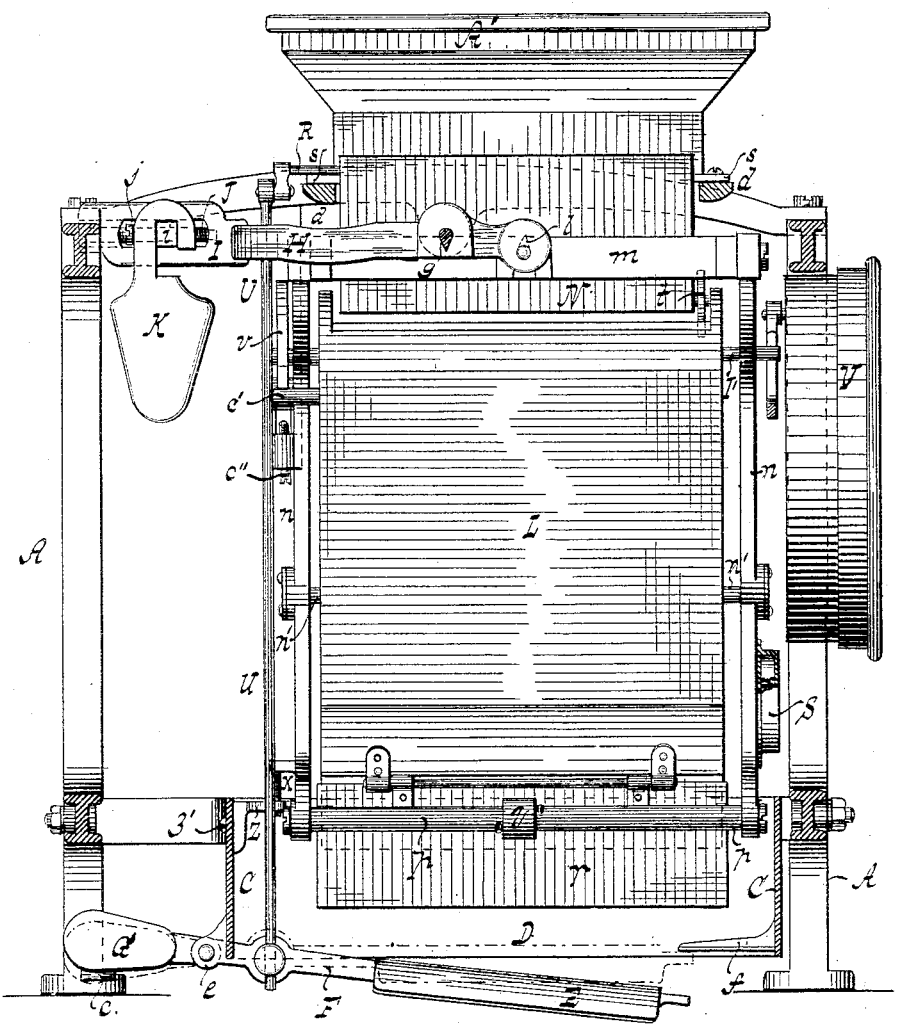
Witnesses:
A. Faber du Faur jr.
William Miller
Inventor:
Moris F. Koch.
by Van Santvoord & Hauff
his Attorneys.

(No Model.) 3 Sheets—Sheet 2.

M. F. KOCH.
AUTOMATIC WEIGHING SCALE.

No. 346,852. Patented Aug. 3, 1886.

WITNESSES:
William Miller
A Faber du Faur

INVENTOR
Moris F. Koch
BY
Van Santvoord & Hauff
ATTORNEYS (No Model.)  3 Sheets—Sheet 3.

M. F. KOCH.
AUTOMATIC WEIGHING SCALE.

No. 346,852. Patented Aug. 3, 1886.

Witnesses:
A. Faber du Faur Jr.
William Miller

Inventor:
Moris F. Koch
by Van Santvoord & Hauff,
his Attorneys

United States Patent Office.

MORIS F. KOCH, OF NEW YORK, N. Y.

AUTOMATIC WEIGHING-SCALE.

SPECIFICATION forming part of Letters Patent No. 346,852, dated August 3, 1886.

Application filed October 29, 1885. Serial No. 181,292. (No model.)

*To all whom it may concern:*

Be it known that I, MORIS F. KOCH, a citizen of the United States, residing at New York, in the county and State of New York, have invented new and useful Improvements in Automatic Weighing-Scales, of which the following is a specification.

This invention relates to automatic weighing-machines; and it consists in the novel combination of devices hereinafter described and claimed, reference being made to the accompanying drawings, illustrating my invention, in which—

Figure 2:
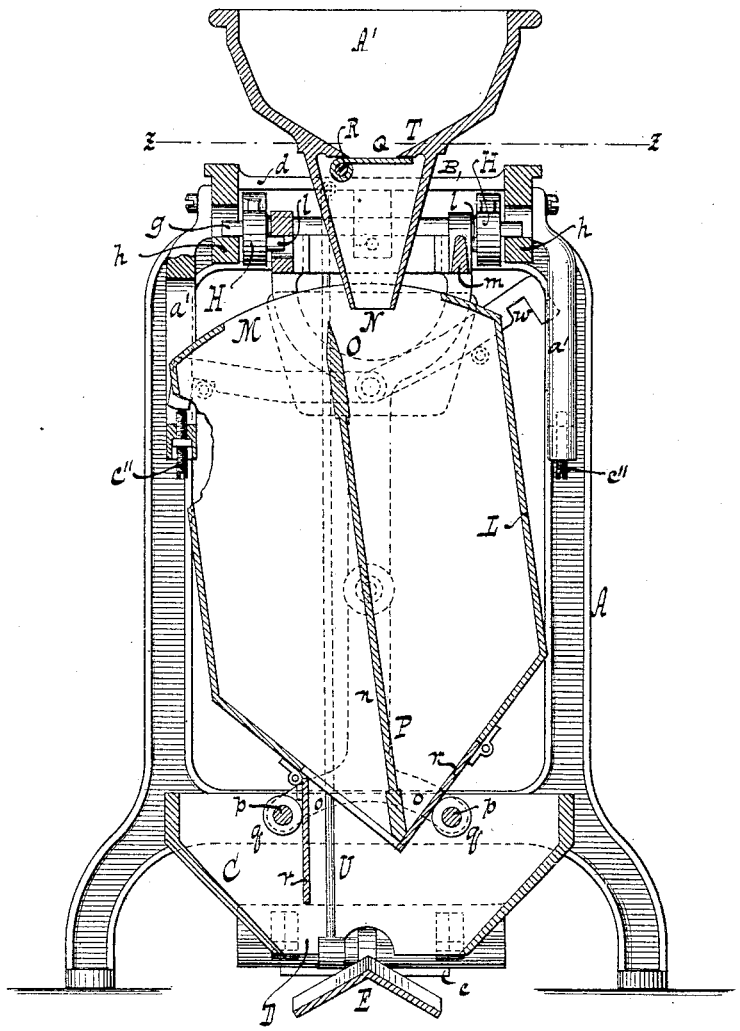
Figure 3:
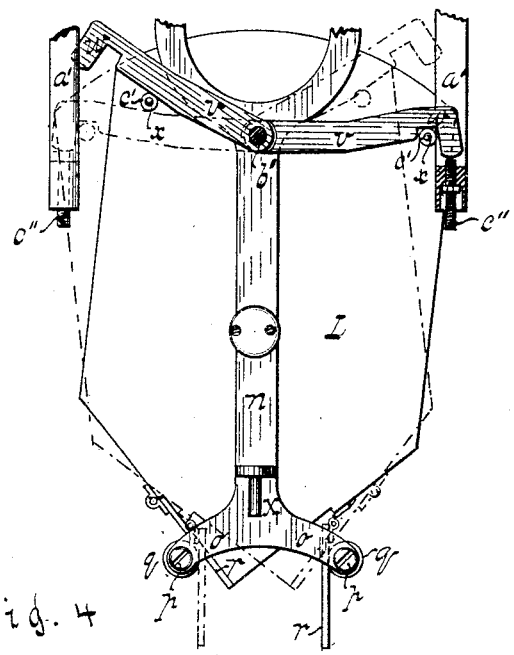
Figure 4:
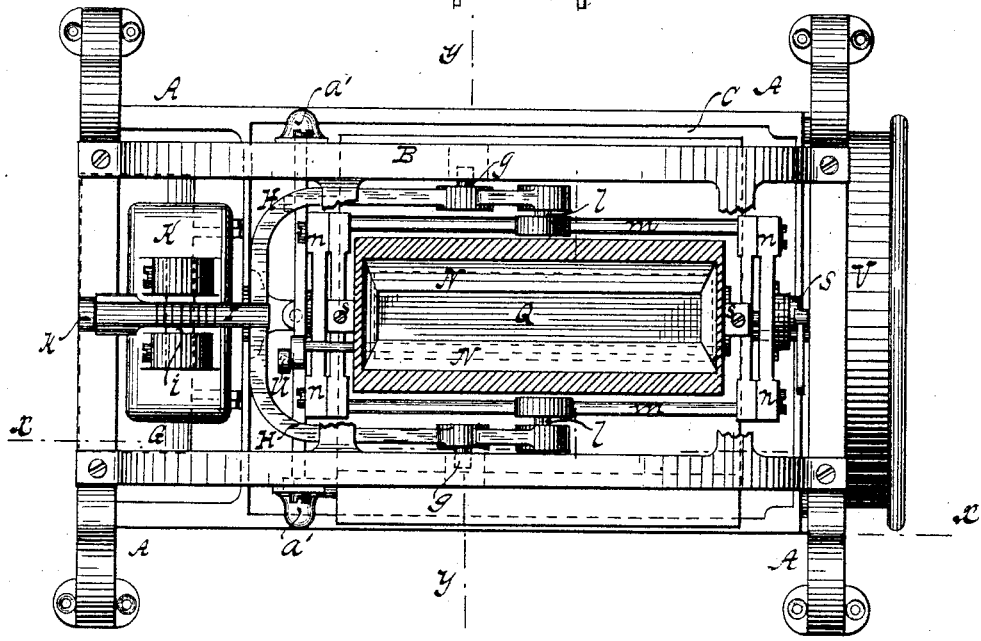

Figure 1 is a section in the plane $x\ x$, Fig. 4. Fig. 2 is a section in the plane $y\ y$, Fig. 4. Fig. 3 is an end view of the oscillating box and adjacent parts. Fig. 4 is a section in the plane $z\ z$, Fig. 2. Fig. 5 is a face view of the dial used for registering. Fig. 6 is a detail view of the guide-pin and bracket.

Similar letters indicate corresponding parts.

The frame A, which supports all of the parts of the scale, is intended to rest upon the edges of the bin or spout into which the scale discharges. In the top of this frame are secured cross-bars $d\ d$. The lower part of the frame A carries a hopper, C. The sides of the hopper C are inclined, leaving an opening, D, for the discharge of the material being weighed. In this opening is placed a ridge-shaped plate, E, which is attached to a lever, F, that is pivoted in the ears $e$ at one end of the hopper C, and provided with a counter-weight, G, capable of holding the free end of the bar F in contact with the under side of a stop, $f$, when there is no discharge upon the plate E of material being weighed.

To prevent too great jarring of the apparatus by the lever F striking against the stop $f$, whereby the accuracy of the weighing might be affected, the counter-weight G can be provided with an abutment, or with a cushion or elastic pad, $c$, which on the descent of the counter-weight G is caused to rest on the edge of the bin or spout into which the scale discharges. The lever F connects, by a rod, U, with the crank-shaft of a gate, Q, which is hung in the upper part of the apparatus, as shown in Fig. 2. A bifurcated scale-beam, H, is provided on opposite sides with knife-edges $g$, which are received in V-shaped bearings formed in ears $h$ projecting downward from the top frame, B. These V-shaped bearings centralize the knife-edges and limit the vibrations of the beam. An arm, I, projecting outward from the scale-beam H and forming a part thereof, is slotted along its length, as shown in Fig. 1, and in this slot is placed a nut which has projecting gudgeons $i$, to which the weight K is fixed by screws $j$, so that said weight K will not swing or vibrate on the gudgeons.

It has been attempted to form the gudgeons $i$ with knife-edges, and to suspend the weight K therefrom, but any suspension of the weight K which leaves said weight free to vibrate has been found unsatisfactory, as a vibration of the weight interferes with the accuracy of the device. The nut which carries the gudgeons $i$ rides on a screw, J, and by turning this screw by means of a screw-driver or other suitable device the nut and the gudgeons $i$ are moved inward or outward at pleasure, and with them the weight K. Said weight can thus receive greater or less leverage, and its effect upon the weighing-box can thus be regulated. The free end of the arm I rests normally on a seat, $k$, formed on the frame A. Knife-edges $l$ project inwardly from the sides of the forked scale-beam H, with their edges uppermost, and are received in V-shaped bearings in a rectangular frame, $m$, which supports the oscillating box L. The frame $m$ is shown in top view, Fig. 4. The ends of the frame $m$ are rigidly secured to the upper ends of upright bars $n$, that are forked at their point of attachment to the frame $m$. The upright bars $n$ are also forked at their lower ends, as shown at $o$, Fig. 2, for receiving the connecting ties or rods $p$, which extend across below the oscillating box L, and which unite the frame $m$, uprights $n\ n$, and rods $p$ all into one rigid structure. Each rod $p$ is provided with a roller, $q$, for closing the gates $r$ at the bottom of the oscillating box L. The oscillating box is provided at opposite ends near the middle of its height, with knife-edges $n'$, which are supported in V-shaped bearings in the perpendicular side bars, $n$. The oscillating box L is partly closed at the top, having, however, an opening, M, into which the supply-spout N projects a short distance. The supply-spout N is provided with flanges s, which are secured to the cross-bars d of the frame A or to other parts of said frame. The flanges s may be formed with slots or elongated holes for the passage of the screws which fasten the spout N to the cross-bars d. By making the slots in the flanges s sufficiently large the spout N can be adjusted laterally on the bars d. The oscillating box L is, by a partition, P, which extends to the lower angle of the bottom of the oscillating box L, divided into two equal compartments, the top of the partition forming a bar, O, with beveled upper edge. A roller, t, is hung to the supply-spout N in position to be touched by the edge of the bar O whenever the said bar passes the center line of the apparatus. The convexity of the roller t prevents the bar O from stopping at or near the center of its oscillation.

To one of the uprights n, Fig. 3, is attached a pin or pivot, b', about which two detent-levers, v, can swing independently of one another. The detent-levers v have nibs w, capable of engaging detent-pins x, extending from one of the walls of the oscillating box L. The levers v thus serve to lock the oscillating box in one position or the other, so as to alternately bring each of the two compartments of the box L under the spout N, and to retain the box in that position until the compartment under the spout N has received its proper weight of material. The free ends of the levers v project into slots in hangers a', which hangers are attached to the frame A. These hangers a' are provided with abutments c'', upon which the free ends of the levers v rest at certain periods. By making the abutments c'' in the form of screws they can be raised or lowered in the hangers a' to such a position as is requisite to secure accurate working of the parts. It is also to be noticed that each of the abutments can be adjusted independently of the other, and thus each of the levers v can be independently regulated with regard to its position on its respective abutment c''. Any slight irregularity in one side of the apparatus as compared with the other side will thus not prevent the proper adjustment of each detent-lever v, and the weighing capacity of the two compartments of the box L is thus under control. When the compartment under the spout N has received its proper amount of material, the weight K is overbalanced, and the box L descends, together with the uprights n and the pivot b'. The levers v also descend, and by this descent the free end of one or the other of said levers v is caused to rest upon its abutment c'', as seen in Figs. 2 and 3. As the box L now continues to descend, the nib w of the lever v which at the time is in engagement with one of the detent-pins x is lifted out of engagement with said detent-pin x, and as the box L is overbalanced by the weight of material in that one of its compartments which has just been supplied with material from the spout N said box L oscillates about its pivots n' until the compartment containing material is swung into a lower position than the other compartment.

Referring to the full lines in Fig. 3, the compartment at the higher side of the box L, and which has the lid r at its bottom closed, is in position to receive a charge from the spout N. When said compartment has received the proper weight of material, the box L descends, and the lever v and the detent-pin x which at the time are in engagement are freed from engagement with one another, and the box L oscillates into the position indicated in dotted lines in Fig. 3. This movement of the box L also causes the levers v and detent-pins x to pass from the positions indicated in full lines in Fig. 3 to the positions indicated in dotted lines in said Fig. 3.

To allow the detent-pins x to slide or move easily along the detent-lever v, said pins x are provided with anti-friction rollers c'.

It will be noticed that the roller t can serve to lock the box L in one position or another without the aid of the detent-lever v; but it is preferable to employ the detent-levers, as said detent-levers and their adjacent parts offer means for exact adjustment. The bottom of the box L is inclined from its sides downward toward the center line, and the gates r, when closed, are in the same plane as the portion of the bottom of the box to which they are attached, so that when open they will be closed by their engagement with the rollers q as the box is oscillated. The supply-spout N is provided with a swinging valve, Q, which is fastened to a crank-shaft, R, extending through the side of the spout. The valve Q closes against a valve-seat, T, in the upper portion of the spout N, and shuts off the supply of material to be weighed. The crank on the end of the shaft R is connected by the rod U with the lever F, so that whenever the said lever is depressed by a discharge from the oscillating box L upon the plate E the supply-spout N will be closed. The registering mechanism in the box V receives motion from some vibrating part of the machine, either from a projection, I', on the box L, or otherwise. The dial W of the register, as shown in Fig. 5, is provided with three circular rows of graduations. One of these circles, 2, has a pointer, 3, which shows thereon each single discharge of the weighing-box L. The inner side of the larger circle, 1, of graduations represents multiples of the motions of the index 3, which are shown by pointer 5, and the multiples of the indication of this circle are in turn denoted by figures outside of the larger circle, 1, by the aid of a pointer, 4. These pointers are turned by suitable means, the pointer 3 moving one step at each discharge from the weighing-box, the pointer 5 one step at each revolution of the pointer 3, and the pointer 4 one step at each revolution of pointer 5. Thus if every ten discharges of the box L yield one bushel the pointer 5 shows the number of bushels between one and one-hundred, and the pointer 4 shows the numbers of bushels from one hundred to ten thousand. The mouth A', through which the supply-spout N receives the material to be weighed, is at the upper end of the spout N, and is in absolute continuity therewith. The spout N dips into the box L, as shown, the partition P reaching up to a less distance than the walls of the box to permit this. By this arrangement it becomes impossible that grain overflow if the weighing apparatus should become clogged.

My improved weighing apparatus is adapted to weighing wheat and other grains, and all kinds of granular, comminuted, and even liquid material.

The operation is as follows: Material to be weighed is conveyed by the mouth A' to the spout N, which delivers it to one of the compartments of the oscillating box L. When enough material has entered the compartment to overbalance the weight K, the box L descends by its own gravity, and, carrying down the uprights $n$ and pivotal ends of the detent-levers $v$, causes the detent-levers to turn on their pivots by contact with the abutments $c''$ and withdraw the nib $w$ from the detent-pin $x$, allowing the superior weight of the filled side of the box L to tilt the box on its knife-edges $n'$ and release the gate $r$ on the filled side of the box L, allowing the material to escape into the hopper C and upon the plate E, causing the lever F to turn on its fulcrum and the box V to register one discharge of the box L, at the same time momentarily closing the valve Q upon its seat T, preventing the flow of the material from the mouth A' until the gate $r$ in the bottom of the empty chamber of the oscillating box L is closed, and until, in fact, the weight G of the lever F lifts said lever, when the valve Q will be again thrown open and the empty compartment of the box L begin to fill. Should the chute into which the hopper C discharges become filled with the material being weighed so as to choke the opening D and prevent the free action of the lever F, the valve Q will remain closed, and the apparatus will cease to operate or waste any grain until the material below the hopper C is removed.

In order to balance any extra weight which may be occasioned at one end of the box L or uprights $n$ by the attachment of the levers $v$, the other end of the box or uprights can be provided with a weight, S. Said weight S can be made adjustable, which is readily accomplished, for example, by making said weight S in the shape of a box or receptacle, of any suitable material, and then placing in said box particles of lead or other material of considerable specific gravity until the proper balancing is obtained. The weight S, while thus being adjustable, is, at the same time very compact and takes up but little space.

In order to prevent the accuracy of the device from being disturbed by any vibrations or oscillations of the uprights $n$, and to confine said uprights $n$ to a simple up and down motion, a guide-pin or arm, X, is attached to one of said uprights, Figs. 1 and 3. This guide-pin moves up and down in a suitable eye in a bracket or arm, Z, as seen in detail in Fig. 6. The bracket or arm Z can be fixed to the spout C by a set-screw or set-screws, $z'$.

By forming slots or elongated holes in the spout or hopper C for the passage of the screw or screws $z'$ the bracket Z can be adjusted at various points along the spout C, as may be required for bringing the uprights $n$ into proper positions.

I do not limit or confine my improvement to the exact form therein shown and described, as these may be varied without departing from the spirit of my invention.

Among obvious modifications I will mention that the roller $t$ may be journaled upon the bar O. In this case a projection would be formed on the spout N to engage the said roller. It will also be noticed that the arm I, Fig. 4, may be provided with lines or other suitable marks or characters to indicate the various points at which the weight K should be adjusted in order to cause the apparatus to register equal measures of substances having varying specific gravity.

What I claim as new, and desire to secure by Letters Patent, is—

1. The combination, in an automatic weighing-machine, of an oscillating box, L, having attached laterally-projecting detent-pins $x$, a scale-beam, the independently-swinging detent-levers $v$, each having at its outer end a nib, $w$, to engage one of the detent-pins, and the vertically-adjustable abutments $c''$, against which said nibs abut, substantially as and for the purpose described.

2. The combination, in an automatic weighing-machine, of a scale-beam, H, a rectangular frame, $m$, hung from the beam, the uprights $n$, attached to said frame, the oscillating box L, pivoted on the uprights, and having laterally-projecting detent-pins $x$, the independently-swinging detent-levers $v$, pivoted to one of the said uprights, and having nibs $w$ at their outer ends to engage the detent-pins, and vertically-adjustable abutments $c''$, carried by stationary parts of the main frame, and against which abutments the said nibs abut, substantially as and for the purpose described.

3. The combination, in an automatic weighing-machine, of the main frame, a bifurcated scale beam, the rectangular frame $m$, carried by said beam, the uprights $n$, secured to said frame, and provided with attached vertical guide-pins X, the stationary brackets Z, receiving the guide-pins, and the oscillating box L, pivoted to the uprights, substantially as and for the purpose described.

4. The combination, in an automatic weighing-machine, of the scale-beam H, the rectangular frame $m$, hung from said beam, the uprights $n$, secured to said frame and provided with attached vertical guide-pins X, the oscillating box L, pivoted to the said uprights, and the hopper C, arranged below the box and provided with brackets Z, receiving the guide-pins on the uprights, substantially as and for the purpose described.

5. The combination of the scale-beam, the rectangular frame m, supported by said beam, the uprights n, attached to said frame, and having bifurcated lower ends connected by ties or rods p, the vertical guide-pins X, attached to the uprights, the hopper C, having the brackets Z, receiving the guide-pins, and the box L, oscillating on the uprights and provided with hinged doors r, which are closed by the ties or rods connecting the bifurcated ends of the uprights, substantially as and for the purpose described.

6. The combination of the bifurcated scale-beam, the rectangular frame m, supported by knife-edges bearing on the beam, the uprights n, attached to the said frame and connected at their lower ends by ties or rods p, the vertical guide-pins x on the uprights, the stationary brackets Z, receiving the guide-pins, and the partitioned oscillating box L, having hinged doors r, and supported by bearings on the uprights, substantially as and for the purpose described.

7. The combination, with the oscillating box and scale-beam of an automatic weighing-machine, of oppositely-arranged detent-levers v, provided with nibs w, hangers or guides a', and adjustable abutments c'', substantially as set forth.

8. The combination, with the scale-beam, the frame m, hung therefrom, the uprights n, secured to said frame, and the guides X and Z, for the uprights, of the hollow weight-receiver S, secured to one of the uprights, substantially as and for the purpose described.

In testimony whereof I have hereunto set my hand and seal in the presence of two subscribing witnesses.

MORIS F. KOCH. [L. S.]

Witnesses:
 W. HAUFF,
 E. F. KASTENHUBER.